: US 8,373,754 B2
(45) Date of Patent: Feb. 12, 2013

(54) METHOD AND SYSTEM FOR EVALUATING BRIGHTNESS VALUES IN SENSOR IMAGES OF IMAGE-EVALUATING ADAPTIVE CRUISE CONTROL SYSTEMS

(75) Inventors: Andreas Kuehnle, Villa Park, CA (US); Cathy Boon, Orange, CA (US)

(73) Assignee: VALEO Schalter Sensoren GmbH, Bietigheim-Bissingen (DE)

( * ) Notice: Subject to any disclaimer, the term of this patent is extended or adjusted under 35 U.S.C. 154(b) by 361 days.

(21) Appl. No.: 12/673,666

(22) PCT Filed: Aug. 28, 2008

(86) PCT No.: PCT/EP2008/007032
§ 371 (c)(1),
(2), (4) Date: Feb. 16, 2010

(87) PCT Pub. No.: WO2009/030418
PCT Pub. Date: Mar. 12, 2009

(65) Prior Publication Data
US 2011/0109743 A1     May 12, 2011

Related U.S. Application Data

(60) Provisional application No. 60/966,750, filed on Aug. 28, 2007.

(51) Int. Cl.
*G06K 9/46*     (2006.01)
*H04N 7/18*     (2006.01)
*H04N 9/73*     (2006.01)

(52) U.S. Cl. ........ 348/148; 348/149; 348/143; 348/142; 348/658; 382/195

(58) Field of Classification Search .................. 348/142, 348/143, 148, 149, 658, E3.018; 382/195, 382/224
See application file for complete search history.

(56) References Cited

U.S. PATENT DOCUMENTS

| 6,819,779 | B1* | 11/2004 | Nichani | 382/104 |
| 7,956,988 | B1* | 6/2011 | Moran | 356/5.04 |
| 2003/0099407 | A1* | 5/2003 | Matsushima | 382/274 |
| 2006/0184297 | A1* | 8/2006 | Higgins-Luthman | 701/41 |
| 2007/0031008 | A1* | 2/2007 | Miyahara | 382/106 |
| 2007/0127779 | A1* | 6/2007 | Miyahara | 382/106 |
| 2007/0221822 | A1* | 9/2007 | Stein et al. | 250/205 |
| 2008/0094493 | A1* | 4/2008 | Igarashi | 348/254 |

FOREIGN PATENT DOCUMENTS

DE     10 2004 017 890 A1     7/2005
EP     1 708 125 A1     10/2006

OTHER PUBLICATIONS

International Search Report w/translation from PCT/EP2008/007032 dated May 8, 2009 (6 pages).

(Continued)

*Primary Examiner* — Joseph Avellino
*Assistant Examiner* — Aftab Nasir Khan
(74) *Attorney, Agent, or Firm* — Osha Liang LLP

(57) ABSTRACT

A method and an arrangement for evaluating sensor images of an image-evaluating surroundings-detection system on a moved carrier, preferably a vehicle (1), are proposed, wherein areas in the sensor images captured by a camera (4) which are dark in relation to the surroundings are evaluated in chronologically successive evaluation steps in order to determine whether said dark areas are moving toward the carrier at the speed of said carrier, and in that these dark areas are detected as shadows (7) of a static object and corresponding signaling is performed.

11 Claims, 3 Drawing Sheets

OTHER PUBLICATIONS

Rotaru, C., Graf, T., and Zhang, J., "Extracting Road Features from Color Images Using a Cognitive Approach," 2004 IEEE Intelligent Vehicles Symposium, Parma, Italy, Jun. 14-17, 2004 (6 pages).

Bertozzi, M., Broggi, A., and Fascioli, A., "Vision-Based Intelligent Vehicles: State of the Art and Perspectives," Robotics and Autonomous Systems, Elsevier Science Publishers, vol. 32, No. 1, Amsterdam, Jul. 1, 2000 (16 pages).

Ljubo, V. "Intelligent Vehicle Technologies, Chapter 14: ARGO Prototype Vehicle," Intelligent Vehicle Technologies: Theory and Applications, Butterworth-Heinemamm, Oxford, Jan. 1, 2001 (2 pages).

* cited by examiner

METHOD AND SYSTEM FOR EVALUATING BRIGHTNESS VALUES IN SENSOR IMAGES OF IMAGE-EVALUATING ADAPTIVE CRUISE CONTROL SYSTEMS

PRIOR ART

The invention relates to a method and an arrangement for evaluating brightness values, in particular for example dark areas as shadows of a static object, in sensor images of an image-evaluating surroundings-detection system such as is preferably used in driving assistance systems in motor vehicles.

Such driving assistance systems are used to assist a driver of a motor vehicle in carrying out specific operations in road traffic and are already used for a wide variety of tasks. For example, DE 10 2004 017 890 A1 discloses that what is referred to as a LIDAR radar sensor is used to detect a predefined area in the direction of travel ahead of the vehicle in terms of specific objects and specific safety functions can be triggered in good time by means of corresponding evaluation of the sensor signals.

These systems which are known per se can be used, for example, within the scope of an adaptive cruise controller and/or inter-vehicle distance control system of a vehicle, wherein such a control process can then be carried out without intervention by the driver a previously set velocity and/or a previously set distance from a vehicle traveling ahead or from objects located in the direction of travel. This is generally done by correspondingly taking into account the surroundings of the vehicle and, if appropriate, further parameters such as, for example, the weather conditions and visibility conditions. Such a control system is also often referred to as an adaptive cruise control system (ACC system). The ACC system must, in particular, be flexible enough in respect of the increasing traffic density of the present time, in order to react suitably to all driving situations. This requires in turn a corresponding object-detection sensor system in order to supply the measurement data which are necessary for the control process in each driving situation.

For this purpose, camera images or video images are also used in image-evaluating, or else what are referred to as vision-based, driving assistance systems for sensing surroundings, wherein in the known systems objects, obstacles, boundaries of roadways and lanes and distances therefrom are determined from the camera images. For the actual capturing of images, image sensors which are referred to as imagers are used in what are referred to as vision-based surroundings-sensing systems, which image sensors then supply a camera image, also referred to as a sensor image, of the captured surroundings, the pixels or image areas of which can be evaluated in terms of intensity, contrast, color or other parameters using corresponding data-processing means.

However, during the analysis of these video images, bridges or similar static structures or objects such as flyovers etc. can cause problems in the video image analysis because of the light effects which occur as a result of shadows which are thrown onto the roadway under certain light conditions.

DISCLOSURE OF THE INVENTION

The invention is based on a method for evaluating sensor images of an image-evaluating surroundings-detection system on a moved carrier, for example a vehicle in road traffic, in which, according to the invention, areas in the captured sensor images which are dark in relation to the surroundings are advantageously evaluated in chronologically successive evaluation steps in order to determine whether said dark areas are moving toward the carrier at the speed of said carrier, and that these dark areas are detected as shadows of a static object, for example a bridge, a flyover or the like, and corresponding signaling is performed. The invention can advantageously be used in particular in conjunction with a driver assistance system with visual and/or optical sensing of surroundings in a motor vehicle, in which the motor vehicle has a lane-keeping assistance system.

The invention thus proposes an advantageous method for the sensing and evaluation of such shadows, which have to be differentiated from other moving objects or objects causing various disruptive differences in brightness, by means of a time sequence analysis of the sensor images captured by the vehicle. For example, a binary flag can easily be set in the surroundings-detection system as an output signal or for signaling the occurrence of such a shadow, said binary flag characterizing whether or not a sudden shadow situation occurs in front of the vehicle, and also, if desired, how far away the driver is from this situation.

In this context, in each case pixels, a series or an area of pixels of the sensor image which are dark in relation to the surroundings can be evaluated in terms of their distance from the carrier of the image-evaluating surroundings-detection system. These pixels, a series or an area of pixels can also be evaluated in chronologically successive evaluation steps in order to determine whether, and at what time intervals, they are successively congruent with captured areas, defined in the direction of the carrier, within the sensor image.

In addition, an advantageous arrangement for carrying out the method described above is proposed, in which arrangement the image-evaluating surroundings-detection system contains an electronic video camera (for example a CCD camera or CMOS imager) which is mounted on a vehicle as a carrier and continuously captures the area of the vehicle which is at the front in the direction of travel in such a way that in each case a sensor image which is made up of pixels and whose brightness values and, if appropriate, color values depict the surroundings is present. Furthermore, an evaluation unit is present in which dark areas in the sensor image can be detected as shadows of a static object, and corresponding signaling can be carried out.

In this context, the evaluation unit can easily be additionally supplied with the speed of the vehicle which is detected with other means. The signaling can take place by means of a display unit in which the detection of the shadow, the exiting therefrom and the respective distance of the shadow from the vehicle can be displayed.

In order to evaluate the digital data which is acquired with the camera, a computer program product is additionally proposed which is stored on a medium which can be used by a computer, comprising computer-readable programming means which, when the computer program product is executed on a microprocessor with associated storage means or on a computer, cause the latter to carry out a method or to implement an arrangement for carrying out a method in a surroundings-detection system.

When the method according to the invention is carried out or the proposed arrangement is used, it is possible to assume that the geometry of the camera is configured such that, assuming that the roadway in front is flat and that the camera mounted on the inside of the vehicle does not roll considerably about its own axis, it is possible to connect a series or a pixel in the sensor image to a distance in front of the vehicle. It is therefore possible to construct captured areas as regions in the image at specific distances from the video camera. If a dark area occurs in a distant captured area and approaches the vehicle at the speed of the vehicle, it is thus possible to identify precisely the location of a stationary shadow.

Congruence with a captured area can be detected, for example, if approximately 80 percent of the pixels of this captured area have a brightness value below a predefined threshold. Exiting from the captured areas can be detected if approximately 20 percent of the pixels of this captured area have a brightness value above a predefined threshold.

Such a suddenly occurring shadow is therefore defined by an area which is dark in relation to its surroundings. However, the relative difference with respect to the surroundings must be taken into account in a critical way in the image processing of the sensor image since such dark areas which have to be considered often have a very low contrast and it is often very difficult to evaluate images within such areas. It is therefore appropriate if a threshold for sufficient darkness within a gray scale statistic is set here, and, furthermore, a captured area which was detected earlier was not correspondingly sufficiently dark.

The captured areas each extend, for example, over 20 m in the direction of travel over the roadway and, if a proportion of, for example, 80 percent is dark here, for example at a distance between 60 m and 80 m, it is possible to be relatively sure that this is the case of a shadow.

Confirmation that this dark area (shadow) is approaching the vehicle can be obtained by the fact that after a certain time said shadow is detected later nearer to the camera in a captured area. In particular, as already mentioned above, it is possible to require, for example, that the brightness values in 80 percent of a captured area between 40 m and 60 m are always lower than a predefined threshold. As soon as such a situation with a dark area is firstly detected in a distant captured area lying ahead in the direction of travel and is subsequently detected in a nearer captured area, for example between 40 m and 20 m, this shadow can be confirmed. Such a sequence can therefore occur, for example, in such a way that at first a dark area between 80 m and 60 m is evaluated, followed by the area between 60 m and 40 m and then an area of 40 m and 20 m.

The evaluation of the pixels, of a series or an area of pixels in a predefined time period can advantageously also take place with corresponding illumination control and sensitivity control before automatic illumination control and sensitivity control of the surroundings-detection system or of the camera is carried out. Since the camera looks forward and also moves forward, it is possible to predict the future settings. Exiting from a captured area or the captured areas can be detected, for example, when the illumination control of the surroundings-detection system in the captured areas assumes a constant profile over a predefined time period.

The exiting of the vehicle from an area with a shadow can therefore be detected with unambiguous means. At first, an area which is far enough ahead in the direction of travel and which has become sufficiently bright should be determined. This can be determined from the gray scale statistic of the respective captured area in such a way that 20 percent of the pixels have brightness values which have to be above a comparatively high threshold value, and not just a relatively close captured area has been bright. However, a sufficiently large area of pixels here also ensures that it is possible to be relatively certain that the shadow area is being exited.

It is then possible to check, as described above, that the bright area is approaching the vehicle at approximately the speed of the vehicle. As soon as this situation is detected, it is possible to signal that a shadow will be exited soon. It is advantageous here that, as already mentioned, the parameters of the video camera or of the image evaluation are set as a function of the time in order to produce a sensor image which can be evaluated in an optimum way. For example by virtue of the fact that the amplification of the image or the sensitivity is reduced before large differences in brightness occur or before the actual illumination control of the video camera reacts.

It is also possible for the vehicle to gradually exit the dark area (shadow), in which case this situation can be inferred from the respective brightness statistics or gray scale statistics of the captured areas, the values of which then move gradually back to relatively normal values which correspond to an average brightness value. The illumination control of the typical image evaluation systems attempts here to maintain a gray scale between bright and dark and in some way or other. If the image area statistics are normal for long enough, it is possible to signal that the shadow is no longer seen as such since the image evaluation has now adjusted to something which was earlier dark and has now become brighter. The detection of the normal illumination can take place here by means of a histogram analysis, in which case the usually bimodal histogram (part of the image is bright, another part is dark) changes into a histogram with an approximately unimodal intensity distribution while gradual exiting from the shadow takes place.

In the embodiments according to the invention, moving shadows are advantageously ignored since they do not move at the same speed in relation to the vehicle as the static shadow, for example a bridge. Such static shadows which are at a certain minimum distance from the video camera in a vehicle always move toward the vehicle with the surroundings-detection system at approximately the speed of said vehicle. Deviations from this occur, for example, due to movements such as pitching of the camera in the vehicle.

BRIEF DESCRIPTION OF THE DRAWING

An exemplary embodiment of the invention will be illustrated in the figures of the drawing and explained below. In said drawing.

DESCRIPTION OF THE EXEMPLARY EMBODIMENT

Figure 1:
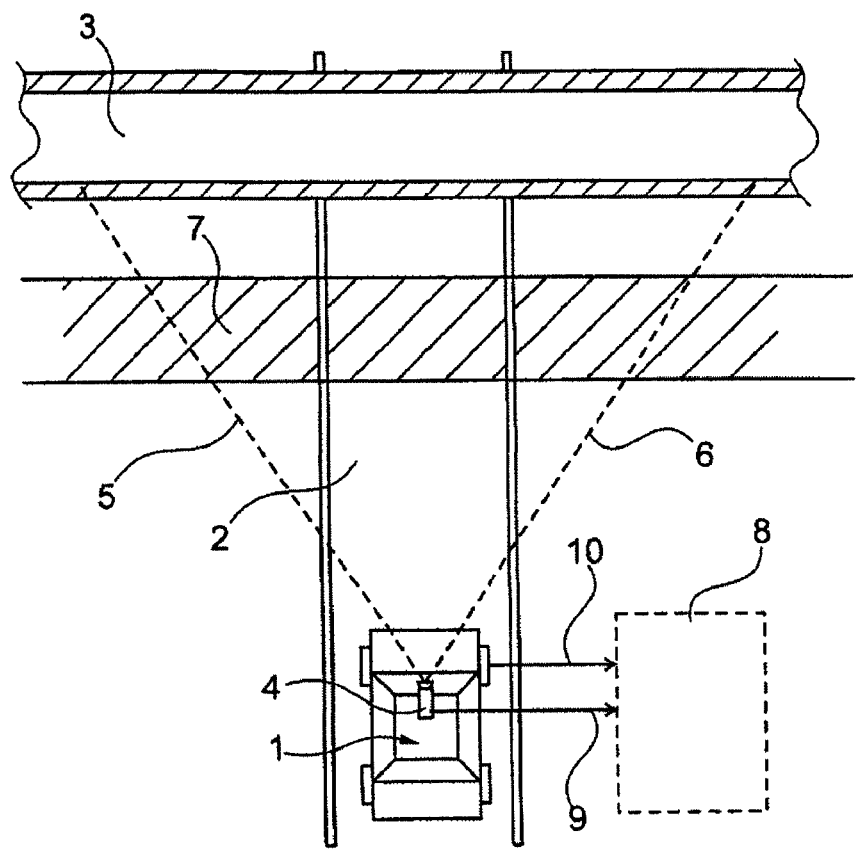
FIG. 1 is a schematic illustration of a vehicle with a camera as a component of a surroundings-detection system, here for evaluating shadows on the roadway.

FIG. 1 shows in schematic form a situation of a vehicle 1 as a mobile carrier of a surroundings-detection system which moves on a roadway 2 in the direction of a bridge 3 as a static object. The surroundings-detection system of the vehicle 1 has a camera 4, in particular a digital video camera, which captures an area between dashed lines 5 and 6. The camera 4 is approaching here a shadow 7 which has been thrown by the bridge 3 onto the roadway 2 under certain assumed light conditions or solar radiation. In an evaluation device 8, the digital data of the sensor image, composed of pixels, of the camera 4 are evaluated at an input 9, and in addition, for example, the current speed data of the vehicle 1 are also evaluated at an input 10.

Figure 2:
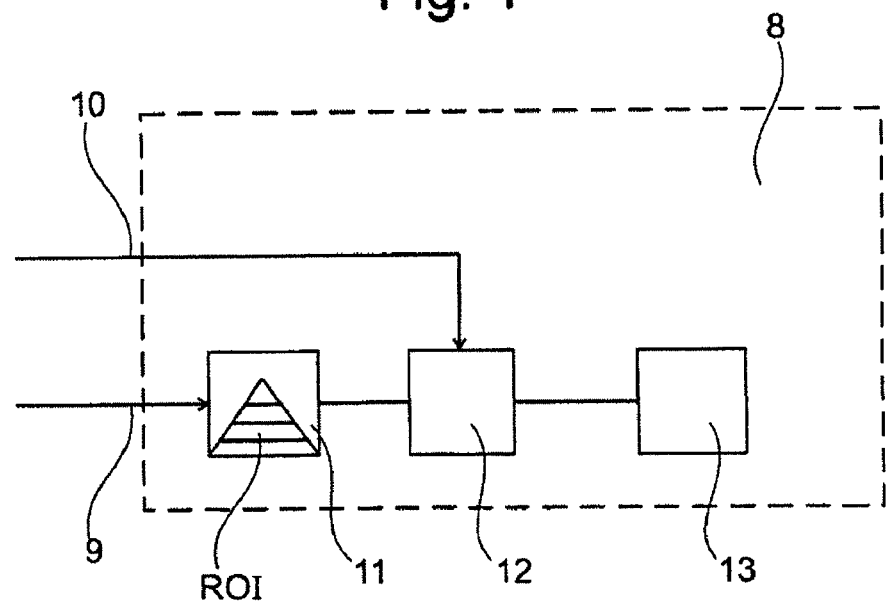
FIG. 2 is a block circuit diagram of an evaluation unit of the surroundings-detection system.

FIG. 2 shows the evaluation device 8 according to FIG. 1 in more detail, with the data of the sensor image of the camera 1 being evaluated, in a first module 1, with respect to the occurrence in predefined captured areas ROI (ROI=region of interest), and on the basis of these results the detection of and, if appropriate, the distance from the shadow 7 according to FIG. 1 are then carried out, as explained below, using the speed data of the input 10 in a module 12, and are displayed in a display device 13 or signaled with corresponding means. For example, a binary flag can also simply be set in the surroundings-detection system as an output signal and/or for signaling the occurrence of such a shadow, said binary flag characterizing whether or not a sudden shadow situation or situation of increasing brightness occurs in front of the vehicle and, if desired, also how far away the driver is from this situation.

With the exemplary embodiment shown, it is possible for a method for evaluating sensor images of the camera 4 of an image-evaluating surroundings-detection system on the vehicle 1 to be carried out in road traffic in such a way that areas which are dark in relation to the surroundings, here the shadow 7, in the sensor images of the camera 4 are evaluated in chronologically successive evaluation steps in order to determine whether the shadow 7 is moving toward the vehicle 1 at the speed of said vehicle 1. In this context, in each case pixels, a series or an area of pixels of the sensor image of the camera 4 which are dark in relation to the surroundings may be evaluated in terms of their distance from the vehicle 1 in the module 12 in FIG. 2 in order to determine whether, and at what time intervals, they are successively congruent with captured areas ROI (module 11), defined in the direction of the carrier, within the sensor image.

Figure 3:
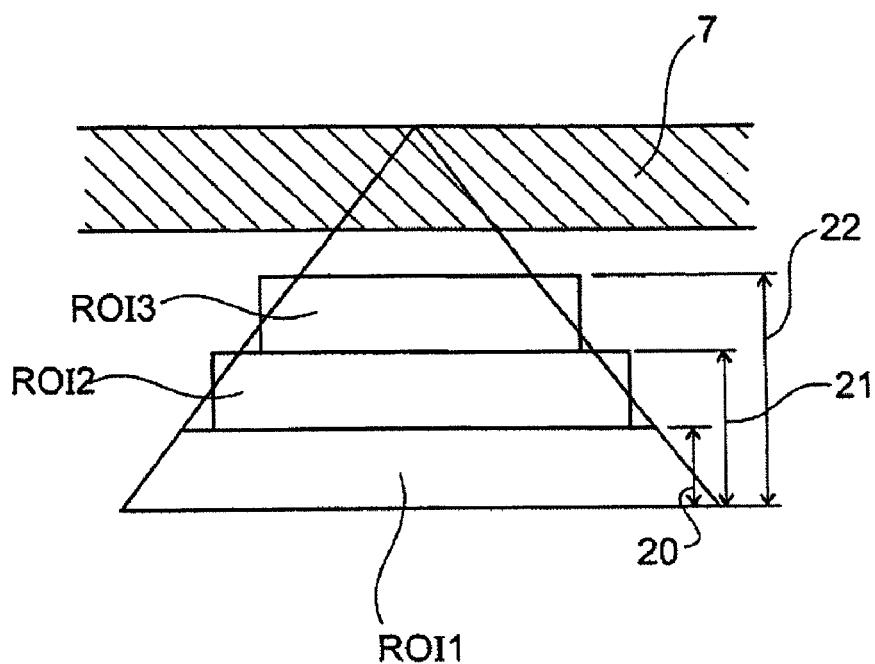
FIG. 3 is a schematic illustration of captured areas of the surroundings-detection system.

The geometry of the camera 4 is generally configured such that, assuming that the roadway 2 ahead is flat and that the camera 1 which is mounted in the vehicle 1 does not roll considerably about its own axis, a series or a pixel in the sensor image can be connected to, in each case, a distance 20, 21 or 22 in front of the vehicle 1 which can be inferred from FIG. 3, for example 20 m as distance 20, 40 m as distance 21 or 60 m as distance 22. It is therefore possible, as is apparent from FIG. 3, to construct captured areas ROI1, ROI2 or ROI3 as corresponding regions in the sensor image of the camera 1 with correlating distances 20, 21 and 22. If, in a chronological progression of the illustration in FIG. 3, a shadow 7 occurs as a dark area in the captured area ROI3 which is distant from the vehicle 1, and said shadow 7 is approaching the vehicle 1 at the speed of said vehicle 1, it is therefore possible for the location of the shadow 7 to be identified precisely as a stationary shadow. It is also advantageous in this context if the instantaneous pitch angle of the camera 1 is also used with each evaluated image.

Figure 4:
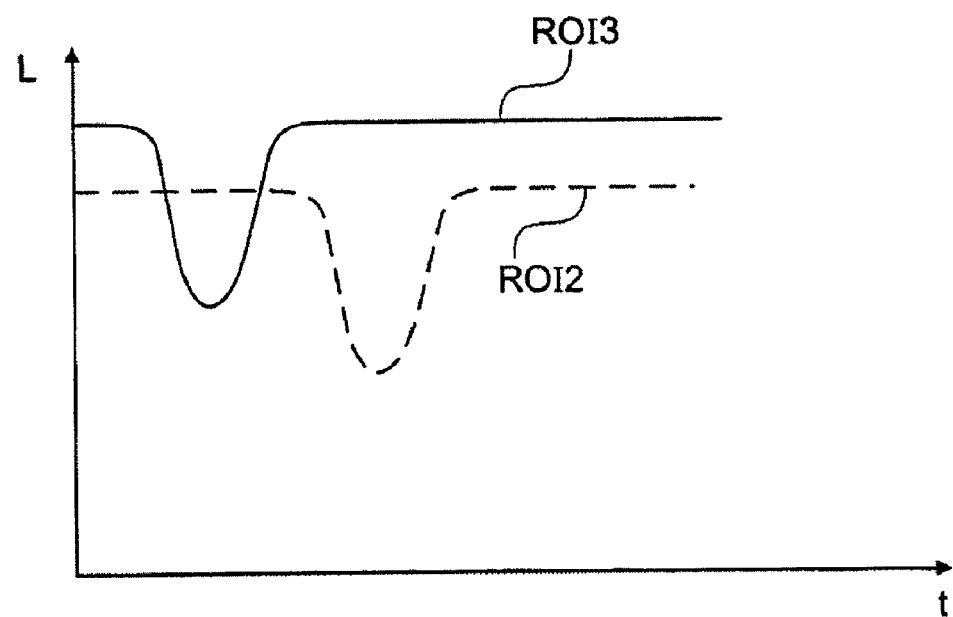
FIG. 4 is a curve diagram of measured brightness values in two captured areas according to FIG. 3.

FIG. 4 shows the profile of acquired brightness values L (L=Level) or gray scale values ROI3 and ROI2 plotted over time t as the vehicle passes through a shadow 7. It is apparent here that it is possible to determine the shadow 7 chronologically and spatially through the falling and rising again of the values for the distant captured area ROI3 and after a time interval the falling and rising again of the values for the nearer captured area ROI2.

Congruence with a captured area ROI3, ROI2 or ROI1 can be detected, for example, when approximately 80 percent of the pixels of this captured area ROI3, ROI2 or ROI1 have a brightness value or a gray scale below a predefined threshold. Exiting from the captured areas ROI3, ROI2 or ROI1 can be detected when approximately 20 percent of the pixels of this captured area ROI3, ROI2 or ROI1 have a brightness value L or gray scale above a predefined threshold and are then displayed according to block 36.

Figure 5:
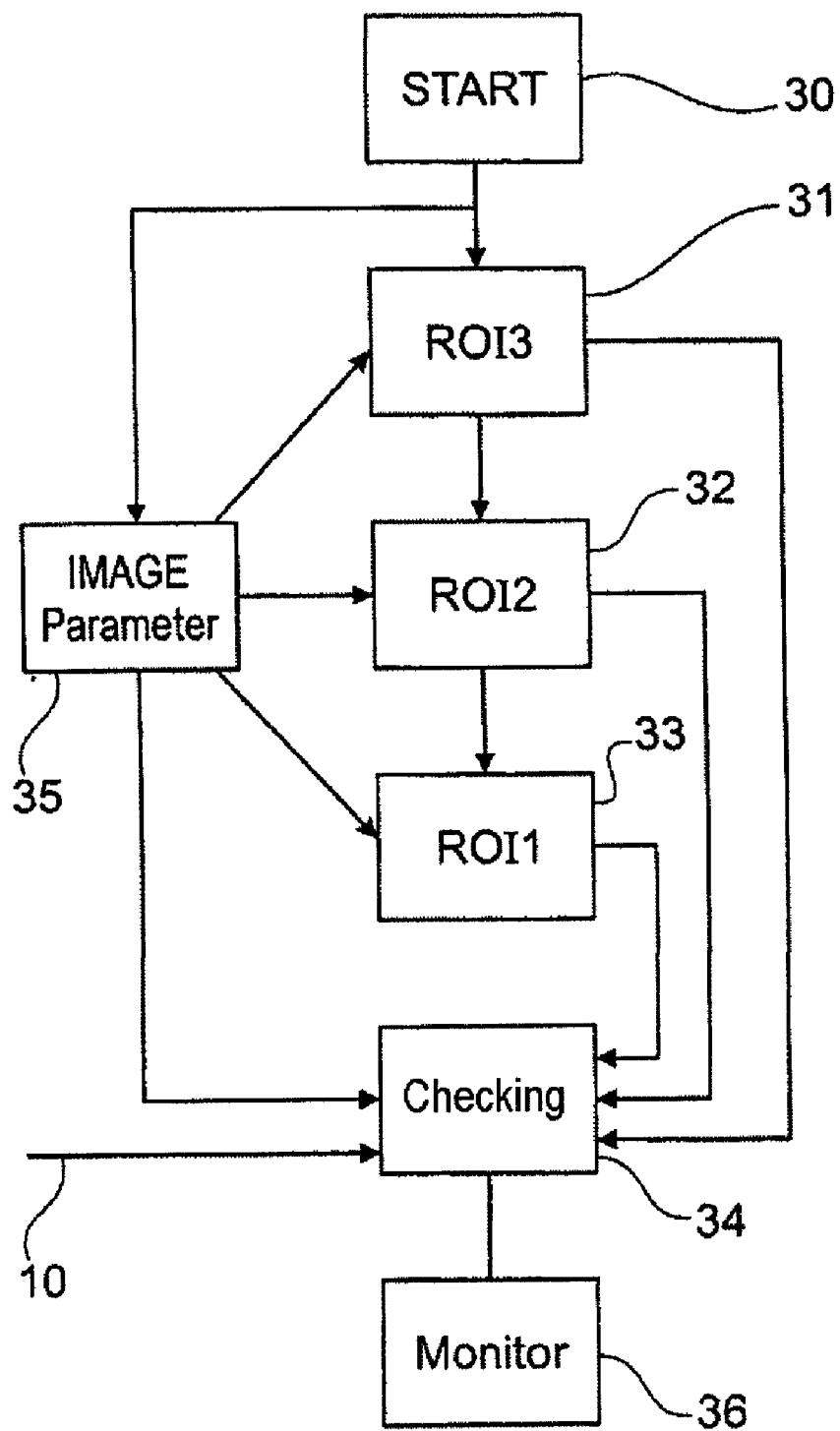
FIG. 5 is a flowchart showing the evaluation of the captured sensor images of the camera.

FIG. 5 illustrates a flowchart which shows the time sequence of the processing in the evaluation circuit 8 according to FIGS. 1 and 2. After the start of the evaluation (start 30), the appearance of the shadow 7 and the exiting of the shadow 7 from the captured areas ROI3, ROI2 or ROI1 are determined in blocks 31, 32 and 33 and are assigned to a block 34 for checking and further processing. The evaluation of the pixels, of a series or an area of pixels in a predefined time period after the start 30 can also take place with a corresponding parameter distribution algorithm 35 (image parameter) before automatic illumination control and sensitivity control of the surroundings-detection system or of the camera 4 is carried out. Exiting from a captured area or the captured areas can be detected, for example, when the illumination control 35 in the captured areas ROI3, ROI2 or ROI1 assumes a relatively constant profile over a predefined time period.

It is then possible also to check whether, by evaluating the speed of the vehicle 1 at the input 10 of the evaluation circuit 8, the area of the changes in brightness which were brought about by exiting from the shadow is approaching the vehicle 1 at approximately the speed of said vehicle 1. As soon as this situation is detected, it is possible to signal with block 36 that a shadow is exiting. It is advantageous here that, as already mentioned, the parameters of the camera 4 or of the image evaluation means 35 are set as a function of time in order to produce a sensor image which can be evaluated in an optimum way. For example by virtue of the fact that the image amplification or the sensitivity is reduced before large differences in brightness occur or before the video camera's own illumination control reacts.

The invention claimed is:

1. A method for evaluating sensor images of an image-evaluating surroundings-detection system on a moving carrier, wherein the carrier has a driver assistance system, comprising:
    evaluating captured sensor images which are dark in relation to the surroundings in chronologically successive evaluation steps;
    determining whether said dark images are moving toward the carrier at a speed of said carrier;
        wherein the dark images are detected as shadows of a static object and corresponding signaling is performed, and
        wherein the driver assistance system comprises a lane-keeping assistance system, and
    evaluating a series or an area of pixels of the sensor image in terms of a distance from the carrier of the image-evaluating surroundings-detection system,
        wherein the series or the area of pixels of the sensor image comprise one selected from the dark images or one selected from a set of captured sensor images that are bright in relation to the surroundings,
        wherein the series or the area of pixels which are dark or bright in relation to the surroundings are evaluated in chronologically successive evaluation steps to determine whether, and at what time intervals, the pixels are successively congruent with captured areas (ROI), defined in a direction of the carrier, within the sensor image, and
        wherein the captured areas (ROI) comprise 80% of pixels with a brightness value below a predefined threshold and 20% of pixels with the brightness value above the predefined threshold.

2. The method as claimed in claim 1, wherein congruence with a captured area is detected when a relatively large number of the pixels of the captured area (ROI) have a brightness value (L) below a predefined first threshold.

3. The method as claimed in claim 1, wherein exiting from the captured areas is detected when a relatively small number of the pixels of the captured area (ROI) have a brightness value (L) above a predefined second threshold.

4. The method as claimed in claim 1, wherein the evaluation of a series or an area of pixels in a predefined time period is performed using a parameter distribution algorithm, before automatic illumination control and sensitivity control of the surroundings-detection system and of the camera is carried out.

5. The method as claimed in claim 4, further comprising:
detecting exiting from a captured area (ROI) when the illumination control of the surroundings-detection system in the captured area (ROI) assumes a constant profile over a predefined time period.

6. A computer program product stored on a non-transitory computer readable medium, comprising computer-readable programming instructions which, when the computer program product is executed on a microprocessor with associated storage means, cause the microprocessor to carry out a method as claimed in claim 1.

7. An arrangement for evaluating sensor images of an image-evaluating surroundings-detection system on a moving carrier, comprising:
an electronic camera of the image-evaluating surroundings-detection system which is mounted on a vehicle as a carrier, wherein the camera is configured to continuously capture an area of the vehicle which is at the front in a direction of travel on a roadway
wherein, in each case, a sensor image comprising pixels and whose brightness values and color values depict the surroundings is present,
an evaluation unit configured to:
detect dark areas in the sensor image of the camera as shadows of a static object, and configured to perform corresponding signaling based on the detected dark areas,
evaluate a series or an area of pixels of the sensor image in terms of a distance from the carrier of the image-evaluating surroundings-detection system,
wherein the series or the area of pixels of the sensor image comprise one selected from the dark images or one selected from a set of captured sensor images that are bright in relation to the surroundings,
wherein the series or the area of pixels which are dark or bright in relation to the surroundings are evaluated in chronologically successive evaluation steps to determine whether, and at what time intervals, the pixels are successively congruent with captured areas (ROI), defined in a direction of the carrier, within the sensor image, and
wherein the captured areas (ROI) comprise 80% of pixels with a brightness value below a predefined threshold and 20% of pixels with the brightness value above the predefined threshold
wherein the vehicle has a driver assistance system comprising a lane-keeping assistance system.

8. The arrangement as claimed in claim 7, wherein the color values of the color blue are utilized through indirect illumination by sunlight.

9. The arrangement as claimed in claim 7, wherein the evaluation unit is additionally supplied with a speed of the vehicle.

10. The arrangement as claimed in claim 7, wherein the signaling is displayed using a display unit in which the detection of the shadow, the exiting of the shadow, and the distance of the shadow from the vehicle is displayed.

11. The arrangement as claimed in claim 7, wherein the dark images are caused by one of a bridge, or a flyover comprising a shadow thrown onto the roadway in front of the vehicle.

* * * * *